US009764253B2

(12) United States Patent
Sams et al.

(10) Patent No.: US 9,764,253 B2
(45) Date of Patent: Sep. 19, 2017

(54) HIGH VELOCITY ELECTROSTATIC COALESCING OIL/WATER SEPARATOR

(71) Applicant: Cameron Solutions, Inc., Houston, TX (US)

(72) Inventors: Gary W. Sams, Spring, TX (US); Harry G. Wallace, Tulsa, OK (US); Davis L. Taggart, Houston, TX (US); David R. Manen, Okemah, OK (US)

(73) Assignee: Cameron Solutions, Inc., Houston, TX (US)

( * ) Notice: Subject to any disclaimer, the term of this patent is extended or adjusted under 35 U.S.C. 154(b) by 1015 days.

(21) Appl. No.: 14/051,105

(22) Filed: Oct. 10, 2013

(65) Prior Publication Data

US 2014/0034504 A1  Feb. 6, 2014

Related U.S. Application Data

(62) Division of application No. 12/048,796, filed on Mar. 14, 2008, now Pat. No. 8,591,714.

(60) Provisional application No. 60/923,925, filed on Apr. 17, 2007.

(51) Int. Cl.
| | |
|---|---|
| *B01D 17/04* | (2006.01) |
| *B03C 5/02* | (2006.01) |
| *B03C 11/00* | (2006.01) |
| *C02F 1/46* | (2006.01) |

(52) U.S. Cl.
CPC ........... *B01D 17/045* (2013.01); *B03C 5/022* (2013.01); *B03C 11/00* (2013.01); *C02F 1/4608* (2013.01); *B03C 2201/02* (2013.01)

(58) Field of Classification Search
CPC ...... B01D 17/045; B01D 17/06; C02F 1/4608
See application file for complete search history.

(56) References Cited

U.S. PATENT DOCUMENTS

| | | | |
|---|---|---|---|
| 1,116,299 A | 11/1914 | Laird et al. | |
| 1,276,387 A | 8/1918 | McKibben | |
| 1,838,931 A | 12/1931 | Fisher | |
| 2,120,932 A | 6/1938 | Dillon | |
| 2,336,542 A | 12/1943 | Hatfield | |
| 2,849,395 A | 8/1958 | Wintermute | |
| 3,253,400 A | 5/1966 | Hass | |
| 3,574,085 A * | 4/1971 | Woelflin ................ | C10G 33/02 204/662 |
| 3,597,346 A | 8/1971 | Waterman | |
| 3,772,180 A | 11/1973 | Prestridge | |
| 3,839,176 A | 10/1974 | McCoy et al. | |
| 3,847,775 A | 11/1974 | Prestridge | |
| 4,116,790 A | 9/1978 | Prestridge | |

(Continued)

FOREIGN PATENT DOCUMENTS

| | | |
|---|---|---|
| GB | 1247500 | 9/1971 |
| GB | 1297447 | 11/1972 |

*Primary Examiner* — Bryan D. Ripa
(74) *Attorney, Agent, or Firm* — Gable Gotwals

(57) ABSTRACT

An apparatus for separating water from a water-in-oil mixture having an elongated inlet vessel with a lower outlet end and an upper inlet end, the length thereof being a multiple of the largest vessel cross-sectional dimension. A separation vessel having an oil outlet and a divergent water outlet has an inlet passageway in communication with the inlet vessel lower outlet end. At least one electrode is positioned within the inlet vessel by which a mixture flowing therethrough is subjected to an electric field.

12 Claims, 8 Drawing Sheets

(56) References Cited

U.S. PATENT DOCUMENTS

| | | |
|---|---|---|
| 4,126,537 A | 11/1978 | Prestridge |
| 4,161,439 A | 7/1979 | Warren et al. |
| 4,200,516 A | 4/1980 | Pope |
| 4,204,934 A | 5/1980 | Warren et al. |
| 4,224,124 A | 9/1980 | Pope |
| 4,283,290 A | 8/1981 | Davies |
| 4,290,882 A | 9/1981 | Dempsey |
| 4,308,127 A | 12/1981 | Prestridge et al. |
| 4,400,253 A | 8/1983 | Prestridge et al. |
| 4,415,426 A | 11/1983 | Hsu et al. |
| 4,417,971 A | 11/1983 | Ferrin et al. |
| 4,469,582 A * | 9/1984 | Sublette .............. C10G 33/02 204/666 |
| 4,479,161 A | 10/1984 | Henrich et al. |
| 4,581,119 A | 4/1986 | Rajani et al. |
| 4,581,120 A | 4/1986 | Sublette |
| 4,601,834 A | 7/1986 | Bailes et al. |
| 4,606,801 A | 8/1986 | Prestridge et al. |
| 4,636,290 A | 1/1987 | Bethuel et al. |
| 4,702,815 A | 10/1987 | Prestridge et al. |
| 4,747,921 A | 5/1988 | Bailes et al. |
| 4,767,515 A | 8/1988 | Scott et al. |
| 4,804,453 A | 2/1989 | Sublette et al. |
| 5,147,045 A | 9/1992 | Chi et al. |
| 5,411,651 A | 5/1995 | Yamaguchi et al. |
| 5,421,972 A | 6/1995 | Hickey et al. |
| 5,464,522 A | 11/1995 | MacEdmondson |
| 5,543,027 A | 8/1996 | Yamaguchi et al. |
| 5,565,078 A | 10/1996 | Sams et al. |
| 5,575,896 A | 11/1996 | Sams et al. |
| 5,643,431 A | 7/1997 | Sams et al. |
| 5,647,981 A * | 7/1997 | Prevost .............. B01D 17/0217 204/660 |
| 5,714,048 A * | 2/1998 | Edmondson ....... B01D 17/0217 204/563 |
| 5,824,203 A | 10/1998 | Remo |
| 6,010,634 A | 1/2000 | Sams et al. |
| 6,113,765 A | 9/2000 | Wagner et al. |
| 6,136,174 A | 10/2000 | Berry et al. |
| 6,315,898 B1 * | 11/2001 | Bull .................... B01D 17/0211 210/187 |
| 6,419,807 B1 | 7/2002 | Davies et al. |
| 6,860,979 B2 | 3/2005 | Sams |
| 7,157,007 B2 | 1/2007 | Frankiewicz et al. |
| 7,163,624 B2 | 1/2007 | Nilsen et al. |
| 2005/0036924 A1 | 2/2005 | Nilsen et al. |
| 2006/0016688 A1 | 1/2006 | Carrier et al. |

* cited by examiner

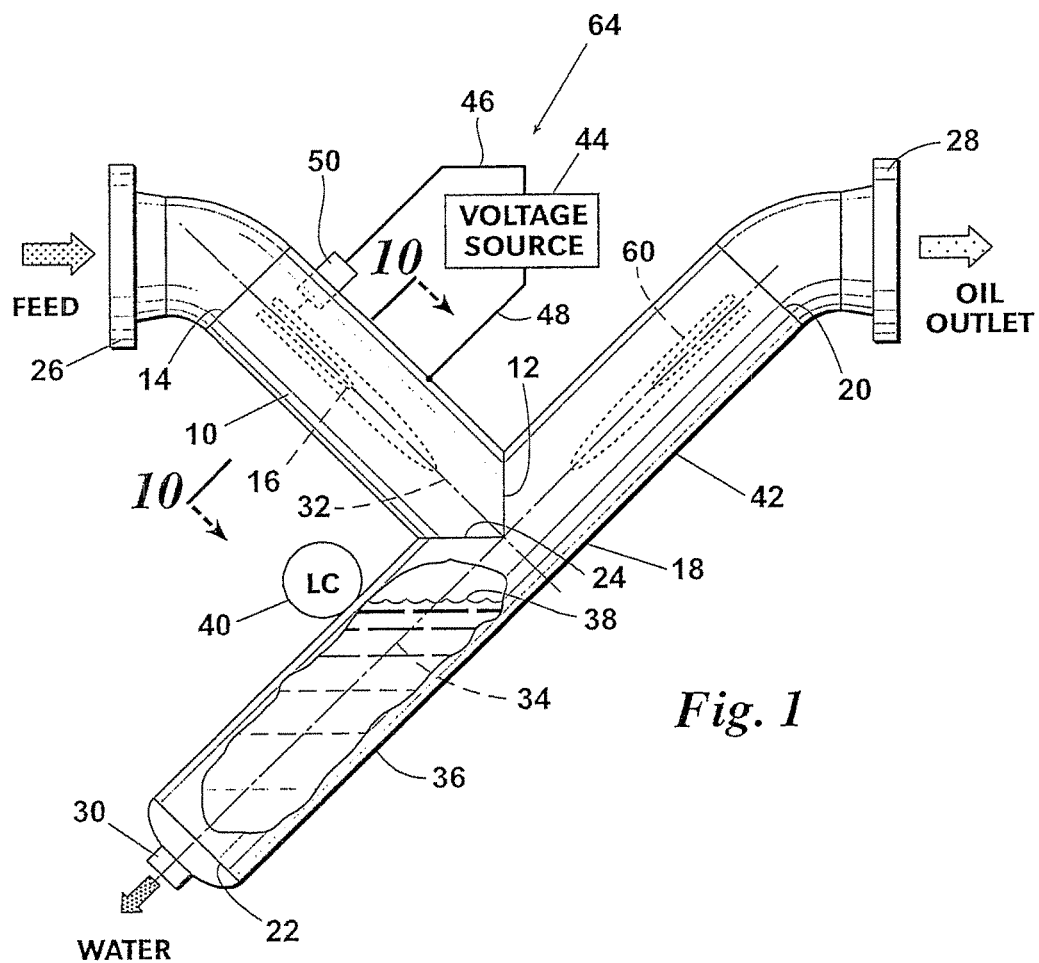
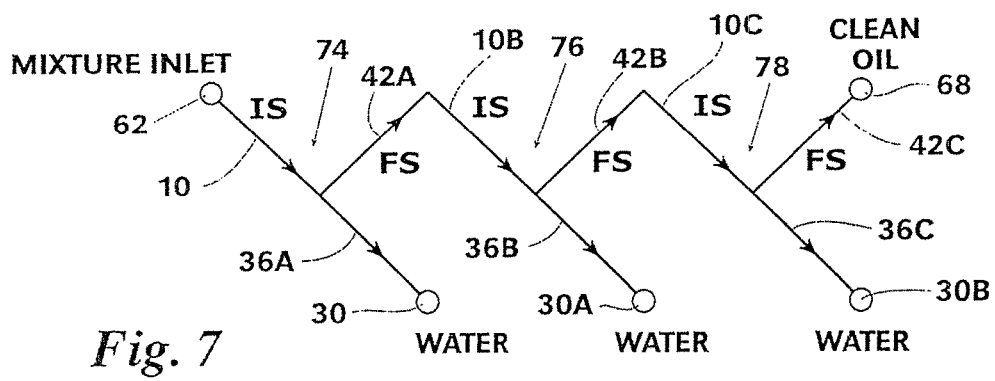

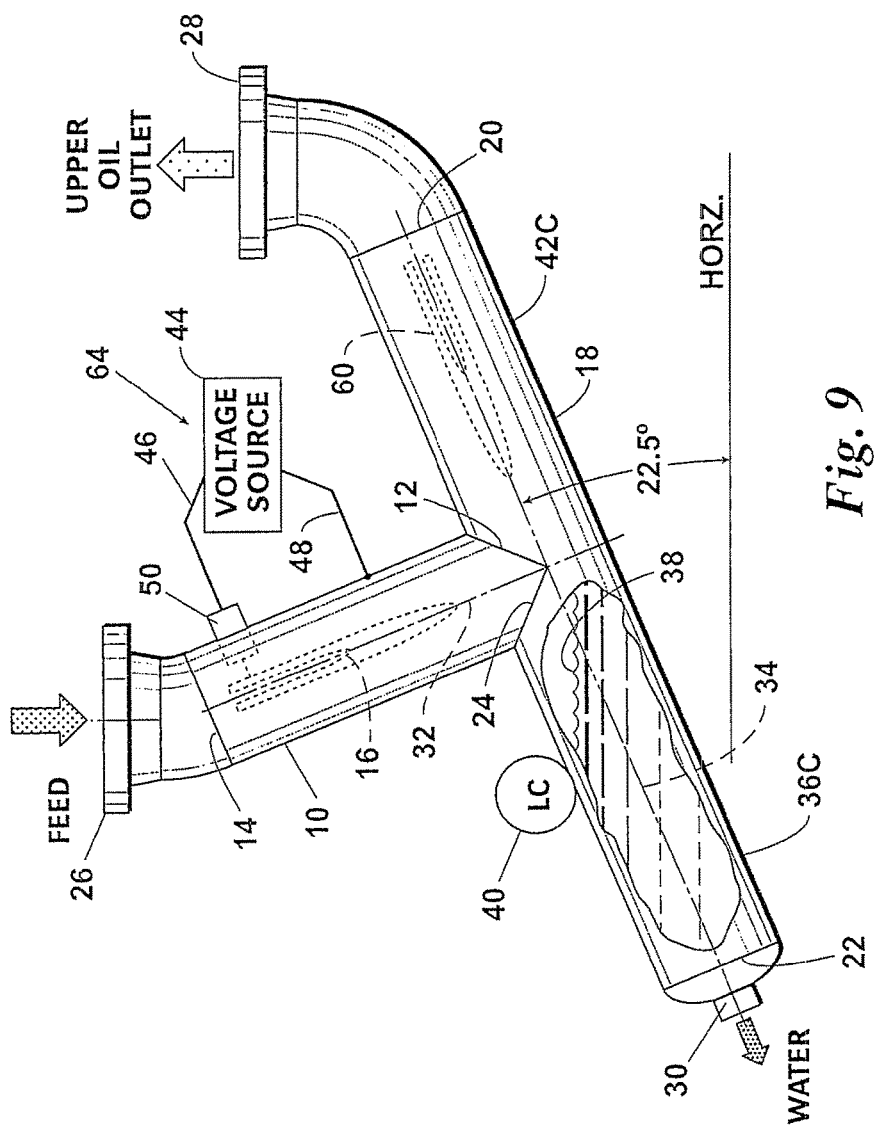
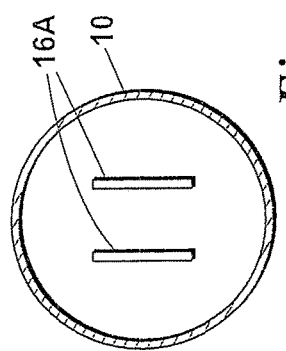
Fig. 10
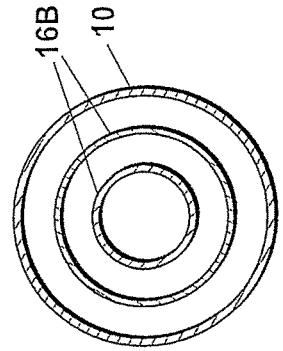
Fig. 11
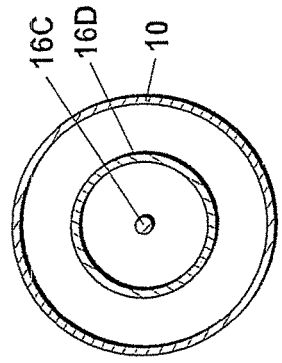
Fig. 12

HIGH VELOCITY ELECTROSTATIC COALESCING OIL/WATER SEPARATOR

REFERENCE TO PENDING APPLICATIONS

This application is a divisional application of U.S. patent application Ser. No. 12/048,796, filed Mar. 14, 2008, which is based upon, and claims priority to U.S. Provisional Patent Application 60/923,925, filed Apr. 17, 2007, entitled "High Velocity Electrostatic Coalescing Oil/Water Separator", the contents of which are hereby incorporated by reference in their entirety.

FIELD OF THE INVENTION

This invention is in the field of electrostatic coalescence of immiscible components of a mixture, and is particularly related to the separation of water from a water-in-oil mixture.

BACKGROUND OF THE INVENTION

One of the world's most useful sources of energy is crude oil, derived from subterranean formations. When crude oil arrives at the earth's surface it is typically in the form of a water-in-oil mixture. That is, crude oil invariably has associated water that must be separated before the oil component can be efficiently refined into useful commercially acceptable products.

A common technique for improving the effectiveness of oil/water separation is by use of coalescence—that is a technique of joining together smaller into larger water droplets that are more readily separated from the mixture. As water droplet size increases, the dynamics of gravitational separation improve. One method of augmenting coalescence of water droplets is by subjecting the mixture to an electric field. Oil, being a non-polar fluid, acts as a dielectric and water droplets, being polar, when subjected to an electric field are coalesced. Coalescence is usually practiced by establishing an electric field between electrodes and passing an oil-in-water mixture through the electric field. Since water is slightly polar, water droplets become polarized by the electric field. Polarized droplets are attracted to each other and move into and coalescence with each other. Larger droplets tend to gravitate downwardly within the mixture and the oil, having portions of the water removed therefrom, tend to gravitate upwardly within the mixture.

Much work has been done in the area of electrostatic coalescence of a mixture to augment separation of oil and water components. Background information relating to the inventive subject matter contained herein can be obtained from the following United States patents:

| Pat. No. | Inventor | Title |
|---|---|---|
| 1,116,299 | Laird et al. | Process of treating petroleum emulsions |
| 1,276,387 | McKibben | Method of separating associated liquids |
| 1,838,931 | Fisher | Apparatus for converting commercial frequency circuits into high frequency circuits |
| 2,120,932 | Dillon | High frequency induction dehydrator |
| 2,849,395 | Wintermute | Method and apparatus for electrical separation of emulsions |
| 3,772,180 | Prestridge | Electric treater |
| 3,839,176 | McCoy | Method and apparatus for removing contaminants from liquids |
| 3,847,775 | Prestridge | Process for electrical coalescing of water |
| 4,126,537 | Prestridge | Method and apparatus for separation of fluids with an electric field |
| 4,161,439 | Warren et al. | Apparatus for application of electrostatic fields to mixing and separating fluids |
| 4,200,516 | Pope | Electrostatic coalescing system |
| 4,204,934 | Warren et al. | Process for application of electrostatic fields to mixing and separating fluids |
| 4,224,124 | Pope | Electrostatic coalescing system |
| 4,283,290 | Davies | Purification utilizing liquid membrane with electrostatic coalescence |
| 4,290,882 | Dempsey | Electrostatic separation of impurities phase from liquid-liquid extraction |
| 4,308,127 | Prestridge | Separation of emulsions with electric field |
| 4,400,253 | Prestridge | Voltage control system for electrostatic oil treater |
| 4,415,426 | Hsu et al. | Electrodes for electrical coalescence of liquid emulsions |
| 4,417,971 | Ferrin et al. | Circuit for maintaining the strength of an electrostatic field generated in a fluid mixture of varying dielectric strength |
| 4,469,582 | Sublette et al. | Electrically enhanced inclined plate separator |
| 4,479,161 | Henrich et al. | Switching type driver circuit for fuel injector |
| 4,581,119 | Rajani et al. | Apparatus for separating a dispersed liquid phase from a continuous liquid phase by electrostatic coalescence |
| 4,581,120 | Sublette | Method and apparatus for separating oilfield emulsions |
| 4,601,834 | Bailes et al. | Settling of liquid dispersions |
| 4,606,801 | Prestridge et al. | Electrostatic mixer/separator |
| 4,702,815 | Prestridge et al. | Distributed charge composition electrodes and desalting system |
| 4,747,921 | Bailes | Liquid-liquid contacting |
| 4,767,515 | Scott et al. | Surface area generation and droplet size control in solvent extraction systems utilizing high intensity electric fields |
| 4,804,453 | Sublette et al. | Resolution of emulsions with multiple electric fields |
| 5,147,045 | Chi et al. | Particulate separations by electrostatic coalescence |
| 5,411,651 | Yamaguchi et al. | Method for electrostatic liquid/liquid contactor |
| 5,421,972 | Hickey et al. | Process and apparatus for removing soluble contaminants from hydrocarbon streams |
| 5,464,522 | MacEdmondson | Electrostatic oil emulsion treating method and apparatus |
| 5,543,027 | Yamaguchi et al. | Apparatus for electrostatic liquid/liquid contactor |
| 5,565,078 | Sams et al. | Apparatus for augmenting the coalescence of water in a water-in-oil emulsion |
| 5,575,896 | Sams et al. | Method and apparatus for oil/water separation using a dual electrode centrifugal coalescer |

-continued

| Pat. No. | Inventor | Title |
| --- | --- | --- |
| 5,643,431 | Sams et al. | Method for augmenting the coalescence of water in a water-in-oil emulsion |
| 5,824,203 | Remo | Method and means for changing characteristics of substances |
| 6,010,634 | Sams et al. | System and method for separating mingled heavier and lighter components of a liquid stream |
| 6,113,765 | Wagner et al. | Methods for enhanced resolution of hydrocarbon continuous emulsions or dispersions with conductivity modifiers |
| 6,860,979 | Sams | Dual Frequency Electrostatic Coalescence |

BRIEF SUMMARY OF THE INVENTION

This invention provides a method and apparatus for separating water from a water-in-oil mixture. The invention is particularly useful for separating water from crude oil. A great deal of the energy consumed on the earth today is derived from crude oil that is found in subterranean deposits and brought to the earth's surface by wells. When the crude oil reaches the earth's surface it invariably is in the form of a water-in-oil mixture. That is, crude oil is usually found associated with water. In order to successfully and economically transport, refine and make use of crude oil, one of the first requirements after the crude oil is brought to the earth's surface is to separate out and properly dispose of the water content. Methods and various systems for accomplishing this are illustrated and described herein.

One embodiment of this invention includes an elongated inlet vessel having a lower outlet end and an upper inlet end. The elongated inlet vessel can typically be in the form of a pipe, the diameter of which will be determined by the quantity of crude oil to be processed. While the pipe is an example of a readily available elongated vessel, the cross-section of the elongated vessel can be square, rectangular or other shape but for all practical purposes a pipe functions completely satisfactory and is readily available and inexpensive.

A second element making up the apparatus of this invention is a separation vessel that has an upper oil outlet, a lower water outlet and an intermediate inlet passageway. As with the inlet vessel, the separation vessel can, by example, be a length of pipe having a circular cross-section and the diameter of the separation vessel can typically be the same or substantially the same as the diameter of the inlet vessel. The separation vessel typically is elongated with respect to the diameter and may typically be about the same in length as the inlet vessel.

At least one electrode is positioned with the inlet vessel by which a mixture flowing therethrough is subjected to an electric field. The electrode may be, as an example, in the form of a coil conductor that receives the voltage applied through an insulator in the wall of the inlet vessel. The voltage may be applied between the electrode and the inlet vessel itself when the inlet vessel is a metallic conductor. The electrode may be insulated or in appropriate applications may be bare, that is in electrical contact with the mixture liquid flowing through the inlet.

The separator functions by providing short liquid flow paths. A mixture, after being subjected to an electric field within an inlet vessel is immediately passed to a separation vessel where passageways are provided for downward flow of separated water and upward flow of oil having a substantial portion of the water extracted therefrom.

The apparatus for separating water from a water-in-oil mixture may be arranged in series relationship whereby the percentage of water removed from the mixture is increased or may be arranged in a parallel relationship to adjust for varying quantities of crude oil being treated.

A better understanding of the invention will be obtained from the following detailed description of the preferred embodiments taken in conjunction with the drawings and the attached claims.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

FIG. 1 is an elevational view of a basic system for practicing the essence of the invention.

FIG. 2 shows a tubular inlet vessel having an electrode therein by which a mixture is subjected to an electrostatic field and divergent water collection and oil collection portions in communication with oil treatment process and water treatment process vessels.

FIG. 4 illustrates an inlet manifold and an outlet manifold that can be used so that the system extending between the manifold may be repeated in parallel to thereby adapt the system for increase volume applications.

FIG. 7 is a diagrammatic view showing how the basic arrangement of FIG. 2 may be repeated multiple times as necessary depending upon the level of dehydration required of the system. As an example, FIG. 4 illustrates two basic systems in sequence whereas FIG. 7 shows diagrammatically three basic systems in sequence.

FIG. 9 illustrates another embodiment of the invention wherein the separation vessel is oriented at about 22.5° relative to horizontal.

FIGS. 10, 11 and 12 provide cross-sectional views of alternate embodiments of the electrode. FIG. 10 illustrates a rod-type electrode configuration. FIG. 11 illustrates a coil-type electrode configuration. FIG. 12 illustrates a plate-type electrode configuration.

DETAILED DESCRIPTION OF THE PREFERRED EMBODIMENTS

Figure 3:
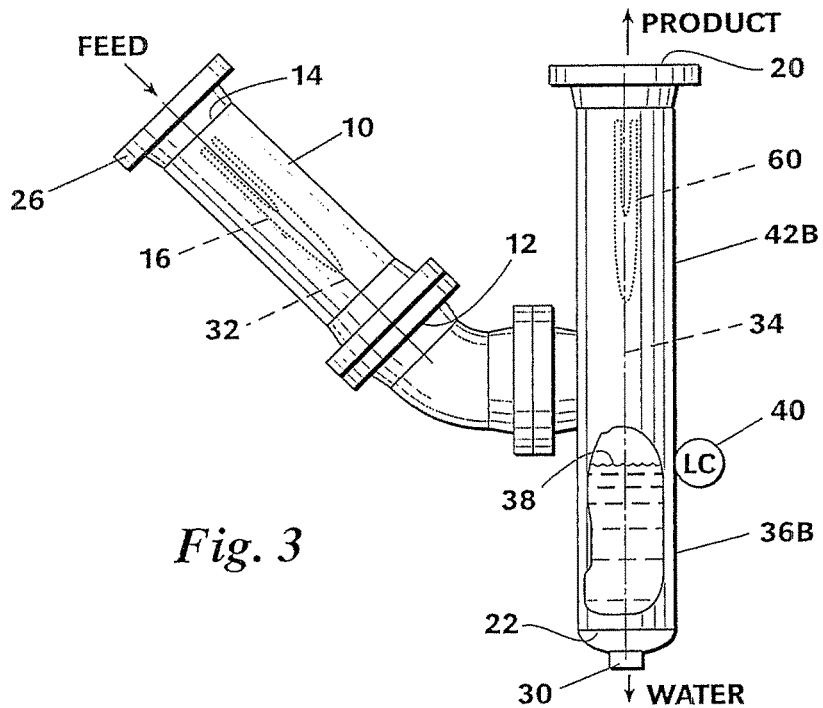
FIG. 3 is another alternate embodiment of the basic concept of the invention wherein the separation vessel is vertical with an upper product outlet and a lower water outlet.

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

Elements shown by the drawings are identified by the following numbers:

| | |
|---|---|
| 10 | Inlet vessel |
| 12 | Lower outlet end |
| 14 | Upper inlet end |
| 16 | Electrode |
| 18 | Separation vessel |
| 20 | Upper oil outlet end |
| 22 | Lower water outlet end |
| 24 | Inlet passageway |
| 26 | Inlet flange fitting |
| 28 | Outlet flange fitting |
| 30 | Pipe outlet fitting |
| 32 | Inlet longitudinal axis |
| 34 | Separation vessel longitudinal axis |
| 36 | Water collection portion |
| 38 | Water level |
| 40 | Water level control |
| 42 | Oil collection portion |
| 44 | Voltage source |
| 46 | Conductor |
| 48 | Conductor |
| 50 | Insulator |
| 52 | Water inlet |
| 54 | Water treatment process vessel |
| 56 | Oil outlet |
| 58 | Oil treatment process vessel |
| 60 | Second electrode |
| 62 | Inlet manifold |
| 64 | First separation system |
| 66 | Second separation system |
| 68 | Outlet manifold |
| 70 | Gas outlet |
| 72 | Piping |
| 74 | First separation system |
| 76 | Second separation system |
| 78 | Third separation system |
| 80 | T-fitting |
| 82 | Wash water inlet |
| 84 | Outlet |
| 86 | Mixing valve |
| 88 | Inlet |
| 90 | Desalter vessel |
| 92 | Water outlet |
| 94 | Oil outlet |
| 96 | Inlet |
| 98 | Preliminary separator |

-continued

| | |
|---|---|
| 100 | Gas outlet |
| 102 | Valve |
| 104 | 3 phase voltage |
| 106 | Rectifier |
| 108 | DC Bus |
| 110 | Modulator |
| 112 | Conductors |
| 114 | Chopper |
| 116 | Primary |
| 118 | Transformer |
| 120 | Secondary |
| 122 | Ground |
| 124 | Conductor |
| 124 | Horizontal transition vessel |
| 128 | Tee fitting |

The basic concept of the invention is illustrated in its simplest embodiment in FIG. 1. Basically the invention includes an elongated inlet vessel 10 having a lower outlet end 12 and an upper inlet end 14. Positioned within inlet vessel 10 is an electrode 16 that provides an electrostatic field through which inlet liquid, identified in FIG. 1 as "feed", flows. In FIG. 1 electrode 16, shown in dotted outline, is positioned within vessel 10 in which the vessel 10 is of conductive material, that is metal, so that the electrostatic field is established between electrode 16 and the wall of vessel 10.

Inlet vessel 10 is elongated, that is, it has a length measured from the upper inlet end 14 to the lower outlet end 12 that is a multiple of the largest vessel cross-sectional dimension. In the illustrated arrangement of FIG. 1 the inlet vessel 10 is in the form of a pipe, that is, a vessel that, in cross-section, is round. The length of vessel 10 should preferably be about twice the vessel diameter, however the precise length is not a critical essence of the invention except that it is important that the vessel 10 be elongated so that fluid flowing therethrough is exposed for a minimum length of time to the electrostatic field established by electrode 16.

A second basic element of the apparatus of FIG. 1 is a separation vessel 18. Vessel 18 has an upper oil outlet end 20 and a lower water outlet end 22. Further, separation vessel 18 has an intermediate inlet passageway 24 that communicates with the inlet vessel lower outlet end 12.

As the invention is illustrated in FIG. 1, an inlet flange fitting 26 is secured to the upper inlet end of inlet vessel 10 and a similar outlet flange fitting 28 is secured to the upper oil outlet end 20 of separation vessel 18. Flange fittings 26 and 28 provide convenient devices for connecting the system of FIG. 1 to piping but are not otherwise involved in the performance of the system. In like manner, the lower water outlet end 22 of separation vessel 18 is provided with a pipe fitting 30 by which water separated by the system may be carried away for disposal or further treatment.

In the embodiment of the invention as revealed in FIG. 1, a mixture of oil and water, designated as "feed" enters the system by way of inlet flange fitting 26 where it passes into inlet vessel 10. The mixture flows through the elongated inlet vessel that is preferably downwardly sloped as indicated. Sloping the inlet vessel helps allow a high liquid flux past the electrodes. Within the inlet vessel the mixture is exposed to an electrostatic field. If electrode 16 within the inlet vessel is covered with insulation then electricity is not directly conducted from the electrode 16 to the mixture but instead only an electrostatic field is maintained within vessel 10 to which the mixture is exposed. By the use of an insulated electrode 16 the voltage between the electrode and the wall of vessel 10 can be significant so that an electrostatic field is applied to the inlet mixture. The electrostatic field causes water droplets within the mixture to rapidly coalesce. The mixture, with a significant portion of the water therein coalesced into large droplets immediately passes directly into separator vessel 18 that preferably is at an angle perpendicular to the longitudinal axis of inlet vessel 10. In FIG. 1 the longitudinal axis of inlet vessel 10 is indicated by the numeral 32 while the longitudinal axis of separation vessel 18 is indicated by the numeral 34.

The mixture having been subjected to an electrostatic field and therefore having past through an environment in which the water is rapidly coalesced enters perpendicularly into separation vessel 18. Within separation vessel 18 the inwardly flowing mixture is offered an immediate opportunity to separate into heavier and lighter components. The heavier component separates from the mixture and flows downwardly within the sloped separation vessel 18 into a water collection portion 36 which is the portion of vessel 18 below inlet passageway 24. Water within water collection portion 36 is maintained at a selected level 38 by means of a water level control 40. The water level control 40 is illustrated diagrammatically since such devices are frequently and customarily used in oil/water separation and are well known to any practitioner in the art. A typical water level control system is illustrated in and will subsequently be described with reference to FIG. 8. Basically, the water level control 40 operates a valve (not seen) connected to the pipe fitting 30 to drain water as it accumulates within the vessel lower portion 36 so that the level 38 stays at a pre-selected height within water collection portion 36.

The mixture flowing out of inlet vessel 10 through lower outlet end 12 separates and the lighter component is carried upwardly into an oil collection portion 42 of separation vessel 18. The oil component of the feed mixture having at least a substantial portion of the water extracted therefrom flows through upper oil outlet end 20 of inlet vessel 10 and through outlet flange fitting 28 for transportation to a pipeline where it may be moved to a refinery, or is conveyed to a facility for storage or further processing.

The system for separating water from a water-in-oil mixture of FIG. 1 is of ultimate simplicity compared to most oil/water separation equipment in use today and yet is arranged to provide improved performance. Specifically, a unique aspect of the separation system of FIG. 1 is that an oil/water mixture is subjected to an electrostatic field and immediately thereafter passes for separation with the water component flowing in one direction and the oil component flowing in an opposite direction. Further, the sloped arrangements of inlet vessel 10 and separation vessel 18 provide immediate gravity-assisted separation of a water-in-oil mixture after exposure to an electrostatic field. The apparatus of FIG. 1 provides the most immediate and effective separation of oil and water in the simplest possible flow arrangement as compared with other known systems.

In FIG. 1 the rudiments of the method of applying an electrostatic field to the mixture within inlet vessel 10 is illustrated. A voltage source 44 provides a voltage output between conductors 46 and 48. Conductor 48 is secured to the sidewall of inlet vessel 10 while conductor 46 is fed through an insulator 50 that extends through the sidewall of vessel 10 to electrode 16. Voltage across conductors 46 and 48 may be an AC voltage, a DC voltage, a pulsing DC voltage or a dual frequency voltage. The particular voltage applied to create an electrostatic field within the inlet vessel is not a critical element of the invention since much work has been done to define the advantages and disadvantages of various voltage systems used to augment coalescence of water in a water-in-oil mixture. As an example, U.S. Pat. No. 6,860,979 teaches a dual frequency electrostatic coalescence system that may be applied to the apparatus of FIG. 1. Such a dual frequency system is better illustrated and will be discussed with reference to FIG. 6.

Figure 2:
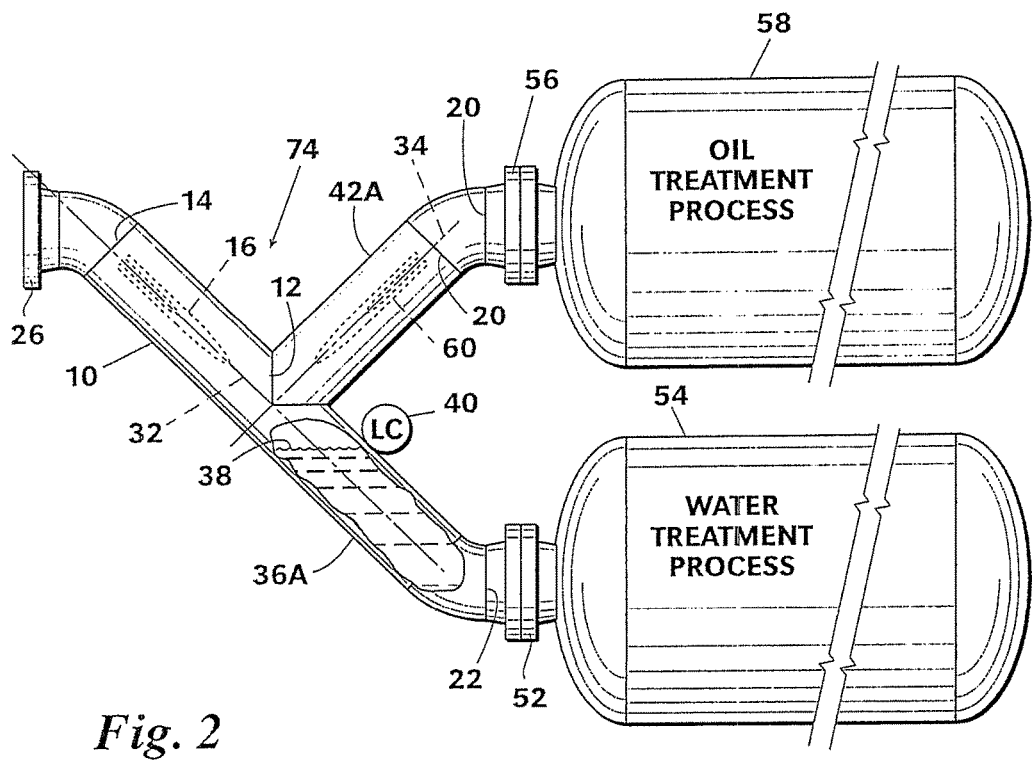
FIG. 2 is an alternate view of a basic system of the invention herein.

The basic system of the invention illustrated in FIG. 1 is susceptible of a variety of modifications. FIG. 2 shows one example of a modification of FIG. 1 in which the inlet vessel 10, lower outlet 12, upper inlet 14, and electrode 16 all have the same element number and same purpose as described with reference to FIG. 1.

Inlet vessel lower end 12 is connected in a straight line with a water collection portion 36A that has a water level control 40 to maintain a water level 38 as described with reference to FIG. 1. The lower water outlet end 22 of the water collection portion in FIG. 2 connects to the inlet 52 of a water treatment process vessel 54 that is illustrative of any system that provides for treating and/or disposing of water extracted from the inlet mixture. The water treatment process 54 may include simply a disposal of the water extracted from the inlet water/oil mixture or it may represent further treatment to remove any residuary oil carried over from the inlet mixture, such as a hydro cyclone, a centrifugal force separator, a gravity separator, a corrugated plate separator, a flotation cell or a filter.

In the arrangement of FIG. 2 the inlet mixture flowing into the system through inlet flange 26 is subjected to an electric field provided by electrode 16 that functions to cause the water portion of the inlet mixture to coalesce. The coalesced water continues to flow downwardly into water collection portion 36A. Oil that separates out of the mixture and therefore that remains above the water level 38 turns upwardly and flows into oil collection portion 42A. Separated oil flows out of the collection portion 42A through upper oil outlet end 20 and through an oil outlet 56 into an oil treatment process area indicated by vessel 58. Oil treatment process vessel 58 is emblematic of any system for further handling, transports, treatment or storage of oil separated by the system of FIG. 2. Typically the oil treatment process 58 can be a storage facility where crude oil having a substantial portion of the water extracted therefrom is stored prior to being transported for further use, such as to a refinery for processing.

Comparing FIG. 2 with FIG. 1 shows two distinct differences. First, FIG. 2 illustrates water treatment process vessel 54 and oil treatment vessel 58 as emblematic of further treatment of separated oil and water exiting from the systems. Second, FIG. 2 compared to FIG. 1 shows a different geometrical arrangement of the flow paths of oil and water that have been separated from an inlet oil-in-water mixture. In both FIG. 1 and FIG. 2 separated oil changes directions and moves upwardly at an angle relative to the flow path of the inlet mixture. However, in FIG. 2, compared to FIG. 1, separated water continues in the same flow path of the inlet vessel. Irrespective of these differences the basic function of the systems of FIGS. 1 and 2 is the same. That is, an inlet mixture of oil-in-water flows in a downward direction through an elongated inlet vessel during which time it is subjected to an electrostatic field and a separation vessel has an inlet passageway in communication with the inlet vessel lower outlet end. FIG. 2 shows an arrangement wherein an inlet mixture of oil-in-water is subject to an electrostatic field and immediately thereafter separate passageways are provided by which the separated water and oil flows in different directions.

FIG. 3 shows another alternate embodiment of the system of this invention. In FIG. 3 inlet vessel 10 is elongated and downwardly sloped, the same as shown in FIGS. 1 and 2. However, in FIG. 3 the oil collection portion 42B is vertically upward. The longitudinal axis 32 intersects the separation vessel longitudinal axis 34 at an angle of about 45°. In FIG. 3 the mixture after having past through the electrostatic field established by electrode 16 within inlet vessel 10 turns and enters horizontally into oil collection portion 42B that is in vertical alignment with water collection portion 36B. Separated water from the mixture coalesced by action of the electrode 16 immediately turns downwardly into the water collection portion 36B and the separated lighter oil component immediately turns upwardly into oil collection portion 42B and flows out upper oil outlet 20. Thus as with FIGS. 1 and 2, the inlet mixture is subjected to an electrostatic field and immediately thereafter the flow from the inlet mixture enters a divergent path in which separated water can flow in a direction divergent from the separated oil. In the case of FIG. 3 the separated water component immediately diverges into a downward path into water collection portion 36B while the separated oil component flows in the opposite direction, that is, upwardly into oil collection portion 42. Thus, FIG. 3 provides the same unique concept as FIGS. 1 and 2, that is, a mixture inlet through an elongated vessel in which the mixture is subject to an electrostatic field followed immediately by divergent flow pathways for the separated water and oil components.

FIG. 9 shows another alternate embodiment of the system of this invention. The inlet vessel 10, lower outlet 12, upper inlet 14, and electrode 16 all have the same element number and same purpose as described with reference to FIGS. 1, 2 and 3. Inlet vessel 10 is elongated and downwardly sloped but with flange fitting 26 oriented to receive a vertical feed. Both the water collection portion 36C and the oil collection portion 42C of the separator vessel 18 are aligned along the separation vessel longitudinal axis 34 and oriented at an angle of about 22.5° relative to the horizontal. The inlet vessel longitudinal axis 32 is perpendicular to the separation vessel longitudinal axis 34. The mixture separates, after having past through the electrostatic field established by electrode 16 within inlet vessel 10, and the separated water turns angularly downward into the water collection portion 36C and the separated lighter oil component turns angularly upward into the oil collection portion 42C and flows out upper oil outlet 20. The outlet flange fitting 28 is oriented such that it can connect to a vertically oriented oil treatment process area. Thus as with FIGS. 1, 2 and 3 the inlet mixture is subjected to an electrostatic field and immediately thereafter the flow from the inlet mixture enters a divergent path in which separated water can flow in a direction divergent from the separated oil. As suggested by FIGS. 1, 2, 3 and 9, the angle of inlet vessel 10 can range from 0° to 45° relative to vertical and the angle of the separation vessel 18 can range from 0° to 45° relative to horizontal.

FIGS. 1, 2, 3 and 9 each make use of plural electrostatic fields. In each of FIGS. 1, 2, 3 and 9, in addition to electrode 16 positioned within the inlet vessel 10, a second electrode 60 is positioned within the oil collection portion 42, that is, there is a second electrode 60 within oil collection portion 42 of FIG. 1, within oil collection 42A of FIG. 2, within oil collection 42B of FIG. 3, and within oil collection 42C of FIG. 9. Each of the second electrodes provide electrostatic fields in the same way as the primary electrode 16 in each embodiment and serves to further aid in the coalescence of any water remaining in the separated oil after first separation has taken place. The secondary electrodes 60 may be insulated or if the percentage of water remaining in the mixture within the oil collection portion of the apparatus has diminished sufficiently then the secondary electrodes 60 may be bare electrodes operating at lower voltages.

Figure 4:
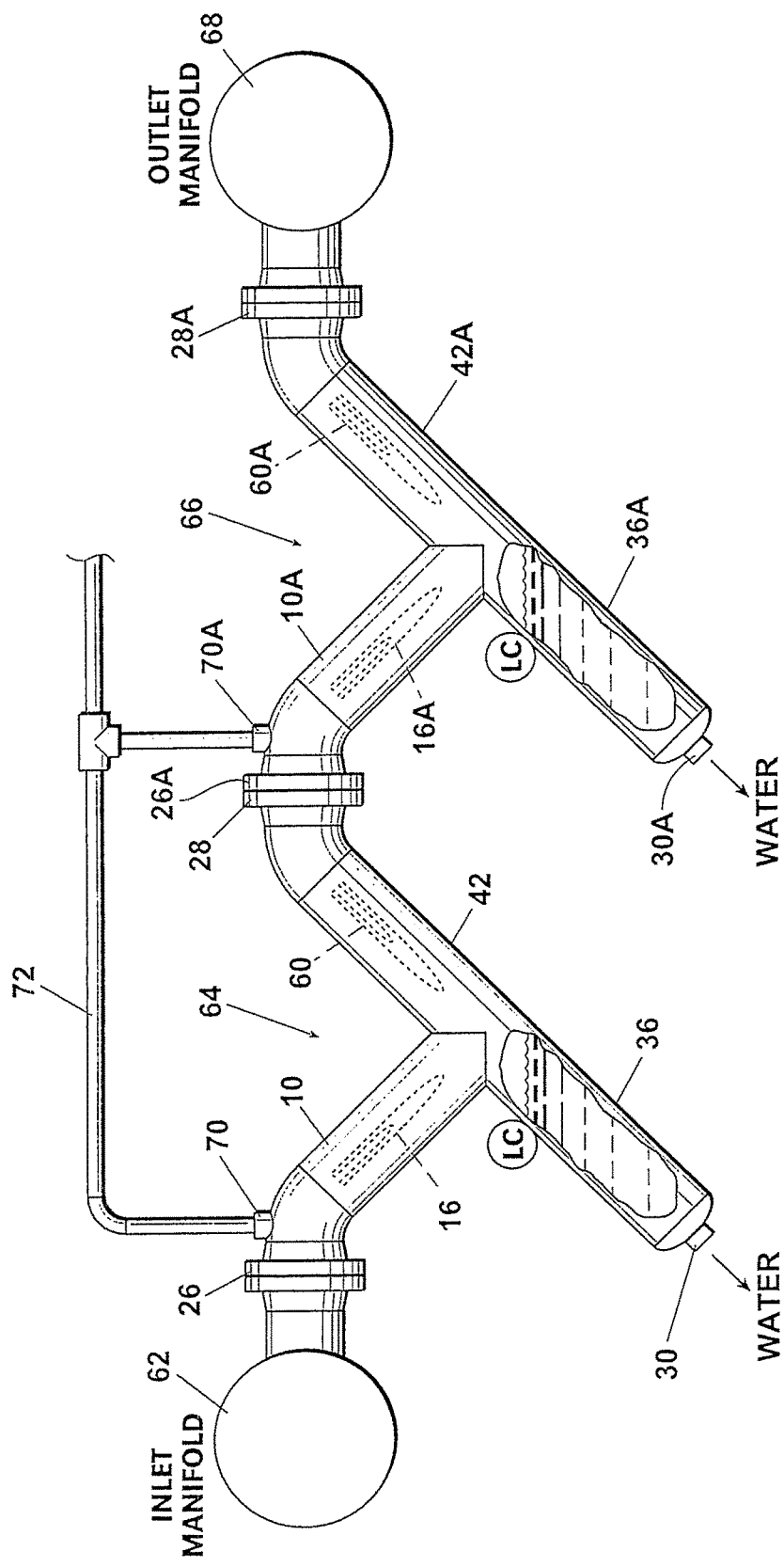
FIG. 4 is an elevational view of an embodiment of the invention showing how basic systems used to practice the invention may be placed in series to achieve greater completeness of separation of water from the mixture. Further.

FIG. 4 shows how the basic separation system of this invention may be used in series to more completely separate water from a water-in-oil mixture. FIG. 4 shows an inlet manifold 62 by which a water-in-oil mixture is fed into a first separation system generally indicated by the numeral 64 that has the components with the same numerical identification as FIG. 1. Outlet flange 28 of first separation system 64 connects to an inlet flange 26A of a second separation system 66. The outlet flange 28A of separation system 66 communicates with an outlet manifold 68 whereby the oil component of the mixture that flows in inlet manifold 62 is collected. Thus the first separation system 64 and second separation system 66 each function identically as has been described with reference to FIG. 1 in that each has an inlet vessel 10, a water collection portion 36 and an oil collection portion 42. Each inlet vessel has an electrode 16 and each water collection portion 36 has a pipe fitting by which water separated from the feed mixture is conveyed away from the separation system. Further, there is a second electrode 60 in both separation systems 64 and 66.

One difference in FIG. 4 compared to FIG. 1 is that a gas outlet is illustrated in communication with each of the inlet vessels 10 and 10A. Each gas outlet 70 and 70A is connected by piping 72 by which gas separated from the system can be carried away, such as to a gas collection facility, a flare or so forth.

FIG. 7 is a diagrammatic illustration of how the separation system of FIG. 2 can be connected in series. FIG. 7 diagrammatically shows a separation system 74 that functions as illustrated and described with reference to FIG. 2 and identical separation systems 76 and 78 connected in series. This is illustrative of the fact that separation systems as described herein may be connected in series with as many as necessary substantially identical separation systems connected in series to achieve the level of separation required.

Referring back to FIG. 4, this view suggests that the separation systems of this invention can easily be placed in parallel. FIG. 4 shows two separation systems 64 and 66 extending in series from an inlet manifold 62 to an outlet manifold 68. It is easy to see that any number of the systems illustrated in FIG. 4 can be placed side-by-side, in parallel, each extending from inlet manifold 62 to outlet manifold 68. In like manner the system of FIG. 7 could easily be placed in parallel with as many separation systems as required according to the volume of a water-in-oil mixture to be treated.

Figure 5:
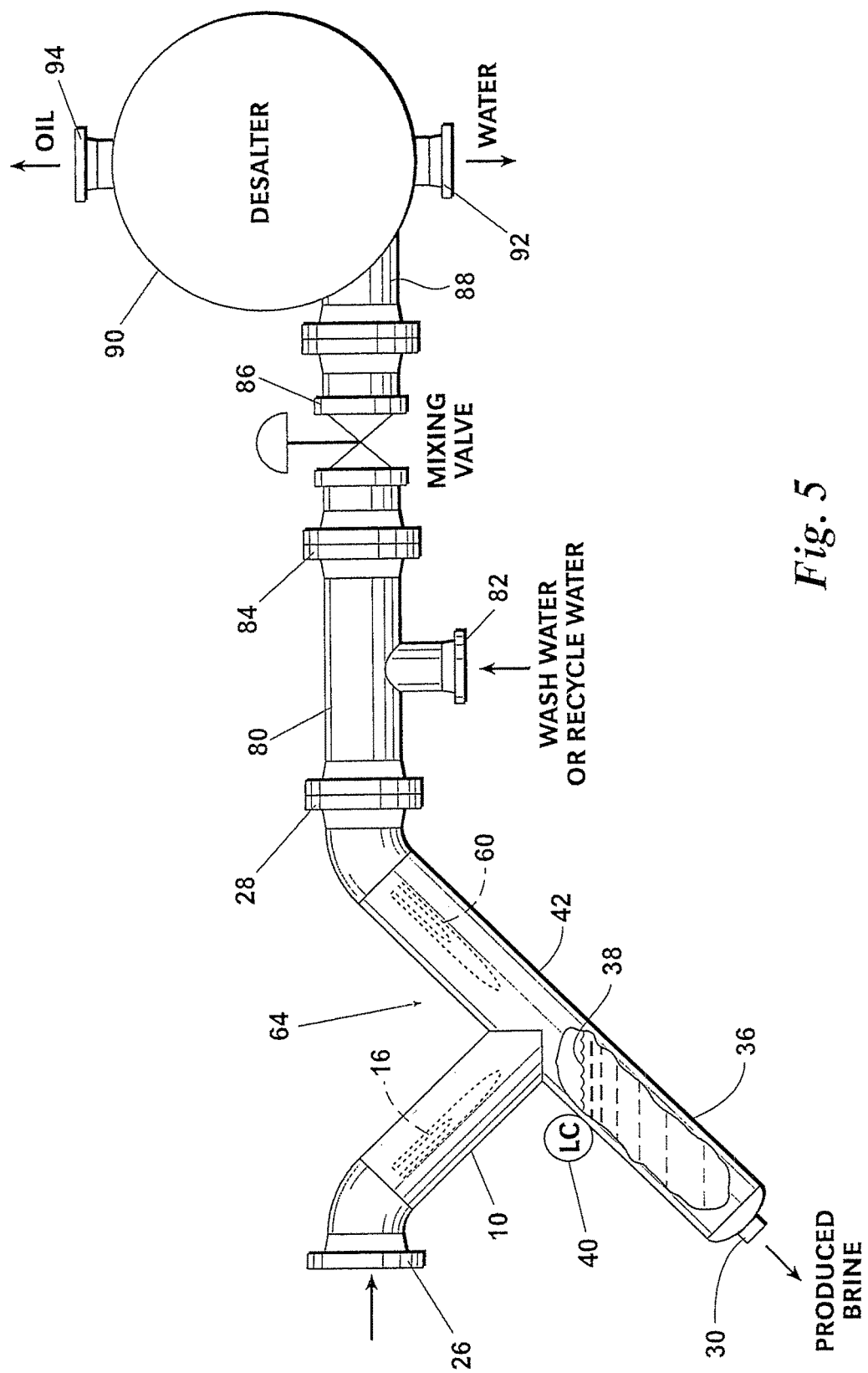
FIG. 5 shows a desalter embodiment of the invention wherein a separation system is used in an application for extraction of salt from a mixture.

FIG. 5 illustrates how a separation system of this invention may be employed in a desalter system. In FIG. 5 a first separation system 64 as is described with reference to FIG. 1 functions to provide separated oil at outlet flange fitting 28 that is connected to a T-fitting 80 having a wash water inlet 82. The separated oil flowing from outlet flange 28 mixes with wash water in T-fitting 80, and the mixture passes out of the T-fitting through outlet 84, through a mixing valve 86 and through an inlet 88 pipe to a desalter vessel 90. In vessel 90 a quiet zone is provided allowing the oil and water to separate. The water introduced through wash water inlet 82 absorbs salt content in the oil discharged from first separator system 64. From desalter vessel 90 water passes out through outlet 92 and oil having substantially all the water and substantially all the salt removed therefrom flows out through oil outlet 94.

The basic concepts of the desalter of FIG. 5 are known, that is the step of using wash water to mix with oil having salt therein is known and is not the essence of the invention.

The significance of FIG. 5 is that it shows how a separation system 64 of this invention can be used in a desalter to improve the efficiency and effectiveness of the desalter system.

Figure 6:
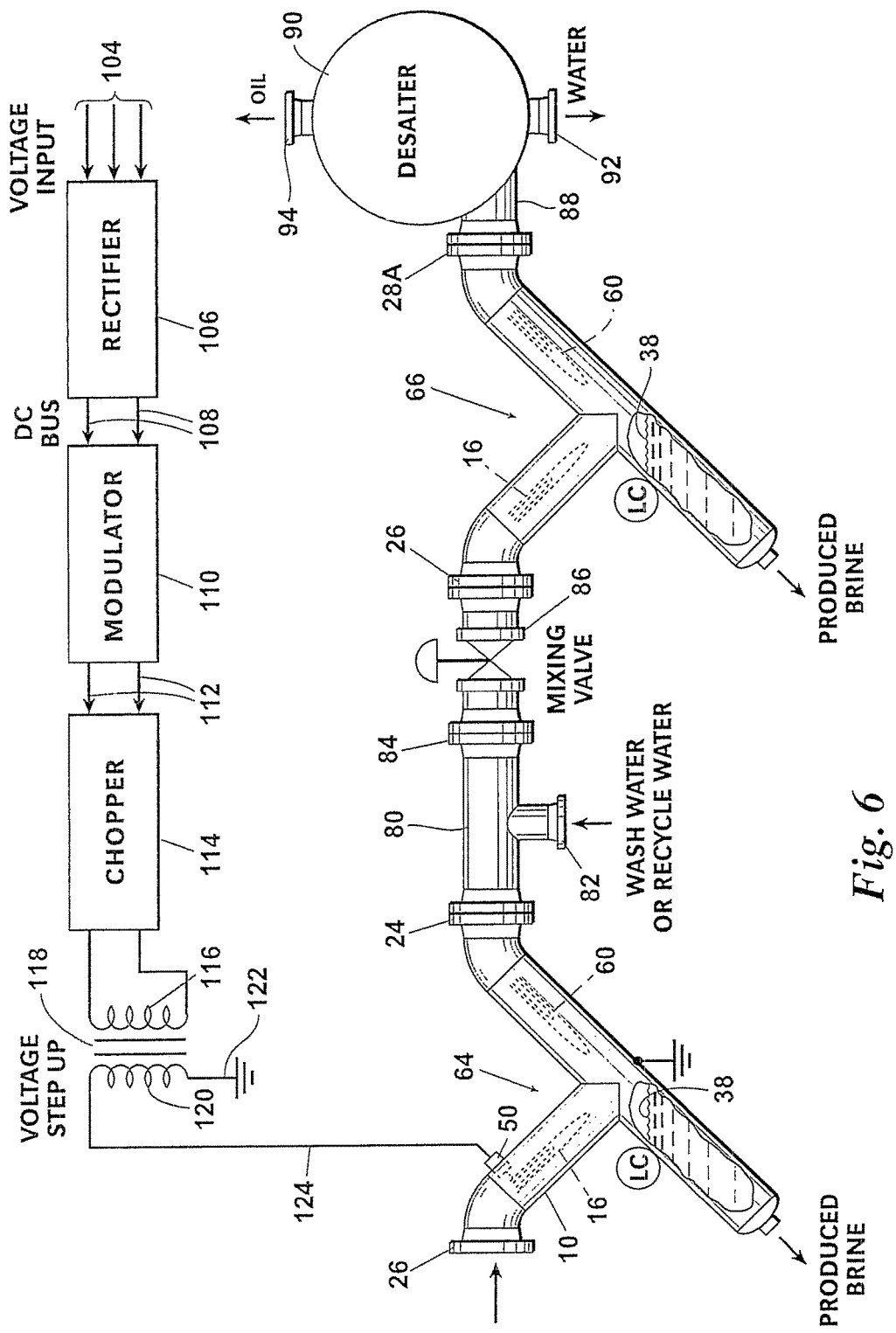
FIG. 6 shows another desalter system and illustrates how two of the basic separation systems of the invention may be employed in a network to provide more thorough water separation and salt removal.

FIG. 6 shows a further illustration of how the separation systems of this invention may be used in a desalting arrangement. A first separation system 64, as illustrated and described with reference to FIG. 1, provides separated oil through outlet flange 24 into a T-fitting 80 having a water inlet 82 as described in FIG. 5. The mixture passes through mixing valve 86 as described and into another inlet flange fitting 26 of a second separation system 66 that again is the same as the basic separation system of FIG. 1. The separated oil flowing through outlet fitting 28A enters a desalter vessel 90 where the water and oil components of the mixture separate by gravitation with the water having dissolved salt therein and relatively salt-free oil passing upwardly and out of the desalter through oil outlet 94.

FIG. 6 shows more details of circuitry by which a voltage may be applied to an electrode within a separation system to which reference will be made subsequently.

Figure 8:
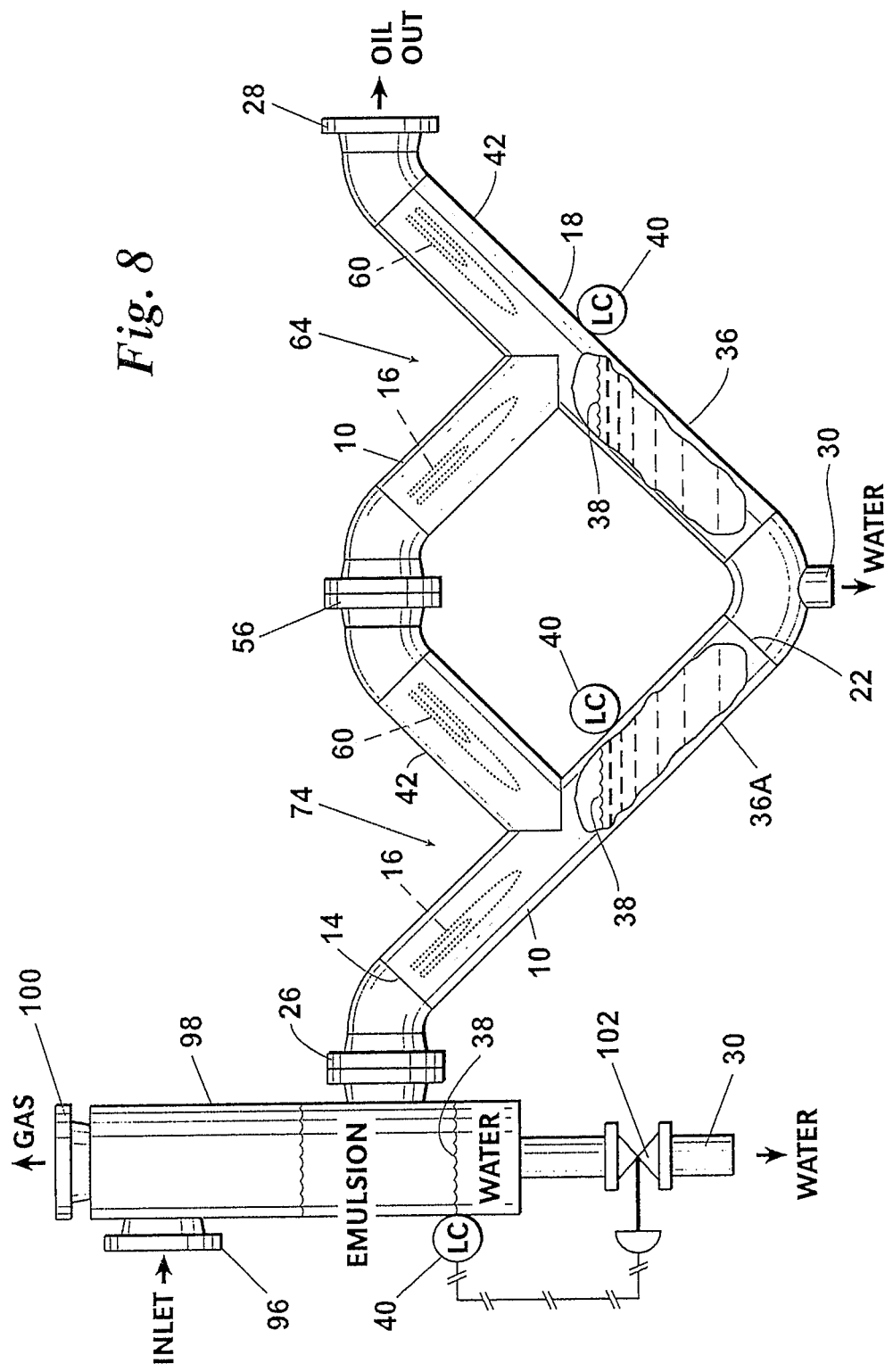
FIG. 8 illustrates another embodiment of the invention wherein the basic separation system of the invention follows an inlet structure particularly useful in extracting gas from the inlet mixture and wherein two basic separation systems, the first like FIG. 2 and the second like FIG. 1, are employed in series.

FIG. 8 shows one way in which separation systems of this invention can be added in series. In FIG. 8 an oil/water mixture enters through an inlet 96 into a preliminary separator 98 that is in the form of a vertical vessel having a gas outlet 100 at the top. Liquid passes downwardly in preliminary separator 98 with easily separated water component settling to the bottom into a water level 38 maintained by a water level control 40. The control 40 operates a water discharge valve 102 so that the level 38 is maintained within vessel 98. A pipe outlet fitting 30 provides for conveying water away from preliminary separator 98. The mixture having gas and easily separated water removed therefrom flows into a first separator system 74 like that described in FIG. 2.

As water is separated from the oil content of the mixture within separation system 74 it flows downwardly into water collection portion 36A and ultimately is drained out pipe outlet fitting 30. Oil from the mixture moves upwardly through oil collection portion 42 where it is again exposed to an electrostatic field by second electrode 60. The separated oil moves through oil outlet 56 and into a second separation system 64 and through downwardly inclined inlet vessel 10 having an electrode 16 therein. In the separation system 64 the mixture is treated as has been described with reference to FIG. 1, that is, in a basic separation system of this invention. From inlet vessel 10, the mixture, after being subjected to the electrostatic field provided by electrode 16, flows into separation vessel 18, the water being channeled downwardly into the water collection portion 36 where it mixes with water draining out of water collection portions 36A of separation system 74 and passes out of the system through a pipe outlet 30. The oil passing out of inlet vessel 10 is channeled upwardly through oil collection portion 42 and out through outlet flange fitting 28, all in the manner as described with reference to FIG. 1.

FIG. 8 is an illustration of how the unique separation system of this invention lends itself to a variety of combinations, all achieved with the basic concepts as revealed in FIG. 1. In the system of FIG. 8 the mixture is subjected to electrostatic field provided by four (4) electrodes. To achieve highly effective separation of water from the oil contained in the mixture, the strength of the electrostatic field of successive electrodes can be increased since each is in a portion of the system wherein the water content of the mixture has been reduced. As an example, while electrodes 16 and 60 of separation system 74 may be insulated, electrodes 16 and 60 of separation system 64 may be uninsulated, that is bare. Additionally, as shown by FIGS. 10, 11 and 12, different electrode configurations may be used for electrodes 16 and 60 in order to achieve the desired electrostatic field. For example, in FIG. 10 electrodes 16A are in the form of parallel plates. In FIG. 11 the electrodes 16B are in the form of concentric cylindrical members 16B, while in FIG. 12 a coaxial electrode 16C is in the shape of a rod surrounded by a concentric cylindrical member 16D. Second electrode 60 may have any of the cross-sectional arrangements shown in FIGS. 10, 11 and 12.

As mentioned with reference to FIG. 1, each of the electrodes employed in the separation systems described herein is supplied by a voltage potential which may be an AC voltage, a DC voltage, a rectified AC voltage or an AC voltage having selected frequencies and wave forms. An effective voltage format for use with the electrostatic separator systems of this invention is a dual frequency voltage as described in detail in U.S. Pat. No. 6,860,979 entitled "Dual Frequency Electrostatic Coalescence." This patent issued on May 1, 2005, and is incorporated herein by reference. FIG. 6 shows a basic circuit revealed in this patent by which a dual frequency voltage is applied to electrode 16 of separation system 64. In this dual frequency circuit a three-phase voltage source 104 is applied to a rectifier 106 to produce a voltage on a DC bus 108. Voltage from DC bus 108 supplies a modulator 110 that, by signals fed on conductors 112, controls a chopper 114 that provides an AC voltage of selectable frequency to the primary 116 of a transformer 118. The secondary 120 of transformer 118 applies voltage between ground 122 and a conductor 124 that supply voltage passing through insulator 50 to electrode 16. The circuit of FIG. 6 provides a method of augmenting the separation of the oil and water components of a mixture flowing through inlet vessel 10 by providing an AC voltage source of a readily selectable frequency F1 that is modulated in intensity at a selected frequency at F2.

Figure 13:
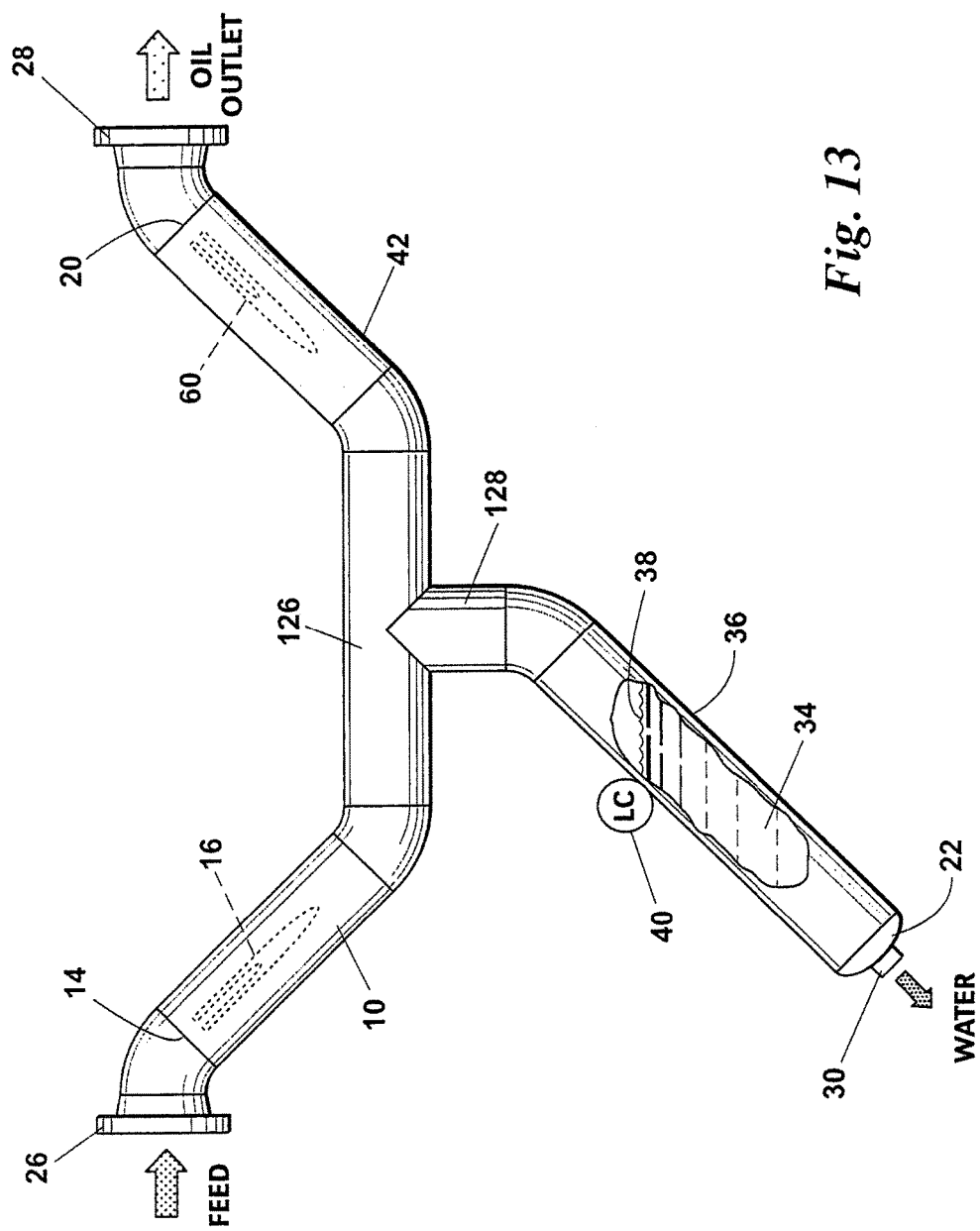
FIG. 13 is an alternate embodiment of the basic system for practicing the invention as first disclosed in FIG. 1. This embodiment employs a horizontal transition section between the inlet vessel and the oil collection portion to reduce turbulence where the flow of separated water diverges from the flow of separated oil.

FIG. 13 illustrates an alternate embodiment of the invention as compared to the basic embodiment of FIG. 1. In FIG. 13 a horizontal transition vessel 126, typically in the form, as illustrated, of a length of pipe, innerconnects oil collection vessel 42 with inlet vessel 10. A tee fitting 128, extends from the bottom of horizontal transition vessel 126 and connects to the inlet of water collection vessel 36. Thus water separating in inlet vessel 10 and oil collection vessel 42 settles to the bottom of horizontal transition vessel 126 and drains out through tee fitting 128 into water collection vessel 36 while encountering reduced turbulence.

In the drawings the basic configurations of the separator of this invention is illustrated in FIGS. 1, 2, 3, 9 and 13. Different systems by which this separator system can be applied are illustrated in FIGS. 4, 5, 6, 7 and 8. FIGS. 5 and 6 illustrate specifically how the separator system herein can be employed in a desalting system in which wash water is utilized. It is important to emphasize that the illustrations of how the separator system of this invention can be modified into various configurations, as exemplified in FIGS. 4 through 8, are examples only and by no means are illustrated as the only arrangements by which the separator system can be employed.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. An apparatus for separating water from a water-in-oil mixture, comprising:
   an elongated inlet vessel sloped relative to horizontal and forming a confined flow path;
   an elongated separation vessel sloped relative to horizontal and including an oil outlet located toward an upper end and a water outlet located toward a lower end and an inlet passageway in communication with the confined flow path; and
   at least one electrode positioned within at least one of said inlet vessel and said separation vessel to subject a mixture flowing therethrough to an electric field.

2. An apparatus according to claim 1 in which said separation vessel has a longitudinal axis and wherein said inlet vessel has a longitudinal axis that intersects said separation vessel longitudinal axis.

3. An apparatus according to claim 2 in which said inlet vessel longitudinal axis intersects said separation vessel longitudinal axis at a right angle.

4. An apparatus according to claim 1 in which said at least one of said inlet vessel and said separation vessel has a longitudinal length at least twice the longest cross-sectional vessel dimension.

5. An apparatus according to claim 1 in which at least one of said inlet vessel and said separation vessel is oriented at an angle of about 45° relative to horizontal.

6. An apparatus according to claim 1 wherein said at least one electrode is insulated or uninsulated.

7. An apparatus according to claim 1 wherein the mixture is subject to two, separate electric fields provided by separate electrodes as it flows between said inlet vessel inlet and said separation vessel oil outlet.

8. An apparatus according to claim 1 including a liquid level control secured to said separation vessel below said inlet passageway by which a liquid level is maintained within a lower portion of said separation vessel.

9. An apparatus according to claim 1 including two or more of said apparatuses, wherein the apparatuses are arranged in series whereby said separation vessel upper oil outlet of a first apparatus is connected to an inlet end of a second inlet vessel or a second separation vessel.

10. An apparatus according to claim 1 including a horizontal transition vessel interposed between said inlet vessel and said separation vessel, wherein a water collection portion is in communication with the horizontal transition vessel.

11. An apparatus according to claim 1 further comprising the outlet end of said inlet vessel being located below the inlet end.

12. An apparatus according to claim 1 further comprising the outlet end of said inlet vessel being located above the inlet end.

* * * * *